(12) United States Patent
Xu et al.

(10) Patent No.: US 8,687,979 B2
(45) Date of Patent: Apr. 1, 2014

(54) METHOD, DEVICE AND SYSTEM FOR GENERATING AND RECEIVING A PHASE POLARIZATION MODULATED SIGNAL

(75) Inventors: Xiaogeng Xu, Shenzhen (CN); Lei Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 138 days.

(21) Appl. No.: 13/272,896

(22) Filed: Oct. 13, 2011

(65) Prior Publication Data

US 2012/0027410 A1 Feb. 2, 2012

Related U.S. Application Data

(63) Continuation of application No. PCT/CN2010/071448, filed on Mar. 31, 2010.

(30) Foreign Application Priority Data

Apr. 13, 2009 (CN) .......................... 2009 1 0106643

(51) Int. Cl.
*H04B 10/50* (2013.01)
(52) U.S. Cl.
USPC ............................ 398/185; 398/184; 398/188
(58) Field of Classification Search
USPC ......................... 398/184, 185, 188
See application file for complete search history.

(56) References Cited

U.S. PATENT DOCUMENTS

| 6,310,709 | B1 * | 10/2001 | Bergano | 398/185 |
| 7,024,123 | B2 * | 4/2006 | Yano | 398/184 |
| 7,277,646 | B2 * | 10/2007 | Kim et al. | 398/185 |
| 7,486,897 | B2 * | 2/2009 | Kim et al. | 398/183 |
| 2003/0002121 | A1 * | 1/2003 | Miyamoto et al. | 359/183 |
| 2005/0111851 | A1 | 5/2005 | Kim et al. | |
| 2007/0166046 | A1 | 7/2007 | Hecker et al. | |
| 2009/0022498 | A1 * | 1/2009 | Shibutani | 398/152 |
| 2009/0086215 | A1 | 4/2009 | Liu et al. | |

FOREIGN PATENT DOCUMENTS

| CN | 1621874 A1 | 6/2005 |
| CN | 1918837 A | 2/2007 |
| CN | 101170363 A | 4/2008 |

OTHER PUBLICATIONS

Written Opinion of the International Searching Authority issued in corresponding PCT Patent Application No. PCT/CN2010/071448, mailed Jul. 1, 2010.

International Search Report issued in corresponding PCT Patent Application No. PCT/CN2010/071448, mailed Jul. 1, 2010.

\* cited by examiner

*Primary Examiner* — Nathan Curs
(74) *Attorney, Agent, or Firm* — Brinks, Gilson & Lione (57) ABSTRACT

In the field of communications transmission, a method, a device, and a system for generating and receiving a phase polarization modulated signal are disclosed. The device for generating the phase polarization modulated signal includes: a Laser Diode (LD), a time division demultiplexer, a phase precoding module, a phase modulating module, a polarization precoding module and a polarization modulating module. The device for receiving the phase polarization modulated signal includes: an optical splitter, a polarizer, a phase demodulating and receiving unit, a Polarization Beam Splitter (PBS), a balanced receiver, a power divider, an exclusive OR, a delayer and a data interface processing unit. Therefore, problems in the prior art that a Differential Quadrature Phase Shift Keying (DQPSK) signal cannot bear and transmit information at a higher rate and that non-linear effect is strong during transmission are solved, and transmission performance of an optical signal is improved.

5 Claims, 5 Drawing Sheets

FIG. 1

( Prior Art)

METHOD, DEVICE AND SYSTEM FOR GENERATING AND RECEIVING A PHASE POLARIZATION MODULATED SIGNAL

CROSS-REFERENCE TO RELATED APPLICATIONS

This application is a continuation of International Application No. PCT/CN2010/071448, filed on Mar. 31, 2010, which claims priority to Chinese Patent Application No. 200910106643.3, filed on Apr. 13, 2009, both of which are hereby incorporated by reference in their entireties.

FIELD OF THE INVENTION

The present invention relates to the field of communications transmission, and in particular, to a method, a device and a system for generating and receiving a phase polarization modulated signal.

BACKGROUND OF THE INVENTION

More requirements for the capacity of a transmission network are brought forward by ever-increasing video services. A main high-end line bearer rate of a current optical transport network is 10 Gb/s, and the high-end line bearer rate of a next generation optical network is 40 Gb/s or higher than 40 Gb/s. In addition, the capacity of Ethernet services is growing at a speed of ten times, and requirements for a bearer bandwidth also increase with a factor of ten.

Figure 1:
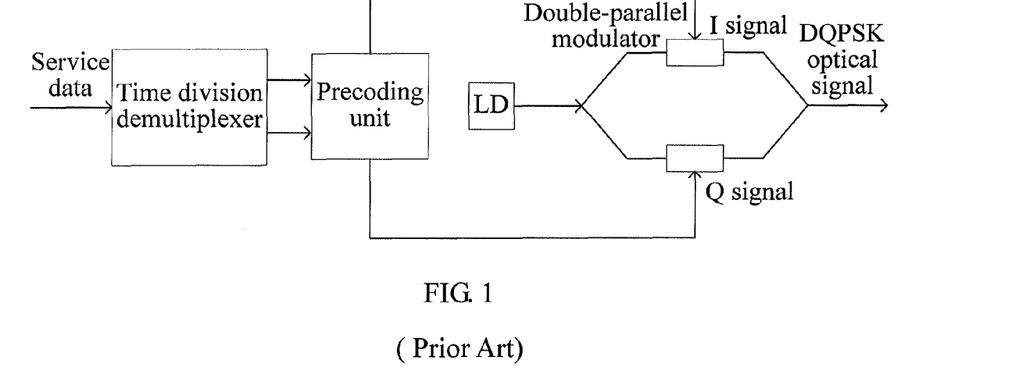
FIG. 1 is a schematic diagram of a device for generating a DQPSK optical signal in the prior art.
Figure 2:
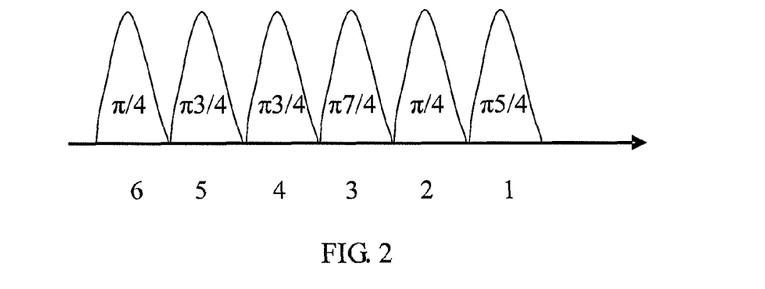
FIG. 2 is a schematic pulse diagram of a DQPSK optical signal in the prior art.
Figure 3:
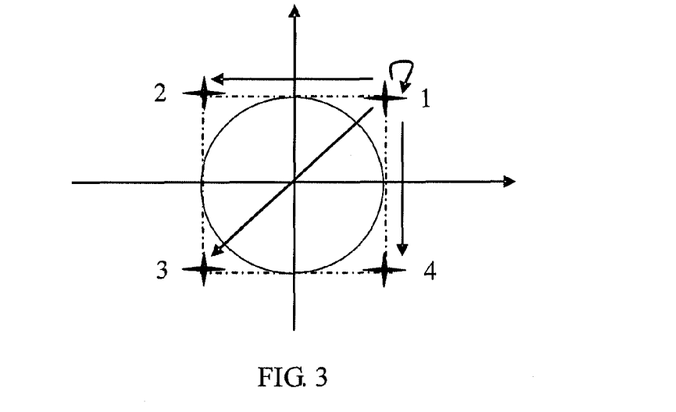
FIG. 3 is a schematic diagram of a constellation diagram of a DQPSK optical signal in the prior art.

An optical line modulation format is critical to an optical transmission system, and a selection of the format directly affects transmission performance, spectral efficiency, non-linear tolerance, and dispersion tolerance of the system. FIG. 1 is a schematic diagram of generating a Differential Quadrature Phase Shift Keying (DQPSK) in the prior art. Service data to be transmitted is processed by a time division demultiplexer, and two paths of sub-service data signals are generated and are respectively input to a precoding unit to be precoded, thereby obtaining an I signal and a Q signal. The I signal and the Q signal are respectively input to two arms of a double-parallel modulator. A Laser Diode (LD) is used to provide the double-parallel modulator with an optical signal. The optical signal provided by the LD is modulated by the double-parallel modulator, and then a DQPSK optical signal carrying the service data is output. FIG. 2 is a schematic pulse diagram of a DQPSK optical signal in the prior art. The service data is represented by a phase difference between two adjacent pulses of the DQPSK optical signal. For example, information is carried through a phase change between a pulse 6 and a pulse 5. Subscripts in FIG. 2 are pulse sequences, and $\pi/4$ and the like are phase information of the pulses. FIG. 3 is a schematic constellation diagram of a DQPSK optical signal in the prior art. Because a quadrature modulation technology is adopted for the DQPSK optical signal, the constellation diagram has four constellation points 1, 2, 3, and 4.

The inventors find during the research that, the constellation diagram of the DQPSK signal in the prior art only has four constellation points, each of which can only carry information of two bytes, while growing transmission services such as video and data requirement for modulation format with higher spectral efficiency. Therefore, the DQPSK signal in the prior art cannot bear and transmit information at a higher rate. In addition, because polarization between adjacent code elements of the DQPSK signal in the prior art is the same, an interference effect cannot be avoided, and the non-linear effect is strong during transmission.

SUMMARY OF THE INVENTION

Embodiments of the present invention provide a device for generating and receiving a phase polarization modulated signal, which address the problems in the prior art that a DQPSK signal cannot bear and transmit information at a higher rate and that the non-linear effect is strong during transmission.

A device for generating a phase polarization modulated signal includes: an LD, a time division demultiplexer, a phase precoding module, a phase modulating module, a polarization precoding module and a polarization modulating module, in which the LD is configured to output an optical signal; the time division demultiplexer is configured to divide service data to be transmitted into first sub-service data and second sub-service data; the phase precoding module is configured to perform phase precoding processing on the first sub-service data, so as to obtain phase precoded first sub-service data; the phase modulating module is configured to phase modulate the phase precoded first sub-service data on the optical signal, so as to obtain a phase modulated first sub-service data optical signal; the polarization precoding module is configured to perform polarization precoding processing on the second sub-service data, so as to obtain polarization precoded second sub-service data; and the polarization modulating module is configured to perform polarization modulating processing on the polarization precoded second sub-service data and the phase modulated first sub-service data optical signal, so as to obtain a phase polarization modulated signal.

A device for receiving a phase polarization modulated signal includes an optical splitter, a polarizer, a phase demodulating and receiving unit, a Polarization Beam Splitter (PBS), a balanced receiver, a power divider, an exclusive OR, a delayer and a data interface processing unit, in which the optical splitter is configured to receive a phase polarization modulated signal and split the phase polarization modulated signal into a first sub-phase polarization modulated signal and a second sub-phase polarization modulated signal; the polarizer is configured to perform polarizing processing on the first sub-phase polarization modulated signal, so as to obtain a first sub-phase polarization modulated signal after being polarized; the phase demodulating and receiving unit is configured to demodulate and receive the first sub-phase polarization modulated signal after being polarized, so as to output a first sub-phase polarization modulated signal after being demodulated; the PBS is configured to perform polarization selection splitting processing on the second sub-phase polarization modulated signal, so as to obtain an X polarization optical signal and a Y polarization optical signal; the balanced receiver is configured to perform balanced receiving on the X polarization optical signal and the Y polarization optical signal, so as to output a balancedly received electric signal; the power divider is configured to divide the balancedly received electric signal into two paths of electric signals, in which one of the two paths of electric signals passes through the delayer, and then passes through the exclusive OR with the other one of the two paths of electric signals, so as to output a second sub-phase polarization modulated signal after being demodulated; and the data interface processing unit is configured to perform time division multiplexing processing on the first sub-phase polarization modulated signal after being demodulated and the second sub-phase polarization modulated signal after being demodulated, so as to obtain service data.

Embodiments of the present invention further provide a method for generating and receiving a phase polarization modulated signal.

A method for generating a phase polarization modulated signal includes, dividing service data to be transmitted into first sub-service data and second sub-service data; performing phase precoding processing on the first sub-service data, so as to obtain phase precoded first sub-service data; performing phase modulation on the phase precoded first sub-service data, so as to obtain a phase modulated first sub-service data optical signal; performing polarization precoding processing on the second sub-service data, so as to obtain polarization precoded second sub-service data; and performing polarization modulating processing on the polarization precoded second sub-service data and the phase modulated first sub-service data optical signal, so as to obtain a phase polarization modulated signal.

A method for receiving a phase polarization modulated signal includes, splitting a phase polarization modulated signal into a first sub-phase polarization modulated signal and a second sub-phase polarization modulated signal; performing polarizing processing on the first sub-phase polarization modulated signal, so as to obtain a first sub-phase polarization modulated signal after being polarized; demodulating and receiving the first sub-phase polarization modulated signal after being polarized, so as to output a first sub-phase polarization modulated signal after being demodulated; performing polarization selection splitting processing on the second sub-phase polarization modulated signal, so as to obtain an X polarization optical signal and a Y polarization optical signal; performing balanced receiving on the X polarization optical signal and the Y polarization optical signal, so as to output a balancedly received electric signal; dividing the balancedly received electric signal into two paths of electric signals, in which one of the two paths of electric signals passes through a delayer, and then passes through an exclusive OR together with the other one of the two paths of electric signals, so as to output a second sub-phase polarization modulated signal after being demodulated; and performing time division multiplexing processing on the first sub-phase polarization modulated signal after being demodulated and the second sub-phase polarization modulated signal after being demodulated, so as to obtain service data.

An embodiment of the present invention further provides a system for generating and receiving a phase polarization modulated signal, which includes the device for generating the phase polarization modulated signal and the device for receiving the phase polarization modulated signal described hereinabove.

In view of the above, in the embodiments of the present invention, phase modulation and polarization modulation are combined at a signal transmitting end, so that each pulse, that is, each constellation point of the generated phase polarization modulated signal may carry information of three bytes or four bytes, and spectral efficiency is improved by 1.5 times to 2 times in comparison with the DQPSK signal in the prior art (each pulse thereof carries information with two bytes). Therefore, with such a transmission manner, the optical signal used in the embodiments of the present invention may carry service information at a higher rate, and requirements of the ever-increasing services on a capacity of a transmission network are met. In addition, because the phase polarization modulated signal is polarization modulated, a polarization state of the phase polarization modulated signal only includes X/Y polarization, and two orthogonal polarization states may not be interfered. In this way, interference effect of the optical signal during transmission is reduced through polarization keying modulation. Further, because differential coding is adopted, the noise floor between adjacent pulses is cancelled, thereby significantly improving transmission performance of the optical signal and contributing to the implementation of the products.

BRIEF DESCRIPTION OF THE DRAWINGS

The accompanying drawings described herein are used to provide a further understanding of the invention, constitute a part of this specification, and does not limit the present invention.

DETAILED DESCRIPTION OF THE EMBODIMENTS

In order to help persons skilled in the art understand and implement the present invention, the embodiments of the present invention are described below with accompanying drawings. Here, the exemplary embodiments and the illustrations of the present invention are only intended to explain the present invention, rather than to limit the present invention.

Figure 4:
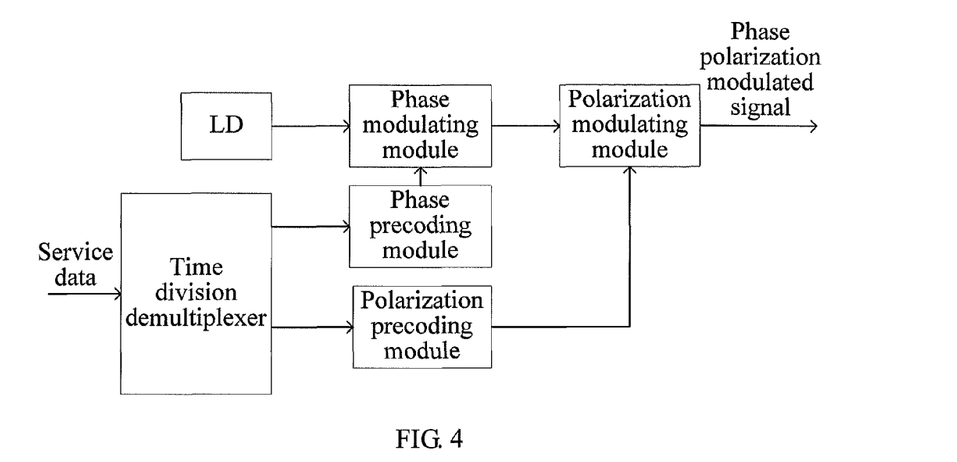
FIG. 4 is a schematic diagram of a device for generating a phase polarization modulated signal according to Embodiment 1 of the present invention.

FIG. 4 is a schematic diagram of a device for generating a phase polarization modulated signal according to Embodiment 1 of the present invention, and the device includes the followings. An LD is configured to output an optical signal. A time division demultiplexer is configured to divide service data to be transmitted into first sub-service data and second sub-service data. In order to meet requirements of an optical communication system, the LD is required to output a signal with a stable wavelength. The time division demultiplexer adopted in this embodiment of the present invention performs time division demultiplexing processing on the service data to be transmitted to divide the service data into two paths of service data in an intervening selection manner. A specific manner may be various, such as 1:2 or 1:4. In various implementation situations, power division is performed on the electric signal, and data is selected by selecting switches, so as to obtain two paths of service data. A phase precoding module is configured to perform phase precoding processing on the first sub-service data, so as to obtain phase precoded first sub-service data. The specific processing procedure of the phase precoding is, inputting the first sub-service data into a coding unit in the phase precoding module, in which the coding unit delays a feedback signal of the output service data signal by one byte, then performing differential coding with the first sub-service data, and finally outputting the phase precoded first sub-service data. A phase modulating module is configured to perform phase modulation on the phase precoded first sub-service data, so as to obtain a phase modulated first sub-service data optical signal. The signal is carried by a phase difference between adjacent pulses in a manner of differential phase modulation, thereby preventing an error brought by phase noise because of fibre transmission. The phase modulating module in this embodiment of the present invention may be a phase modulator or a Mach-Zehnder modulator (MZM). A polarization precoding module is configured to perform polarization precoding processing on the second sub-service data, so as to obtain polarization precoded second sub-service data. The specific processing procedure for the polarization precoding is, inputting the second sub-service data into a coding unit in the polarization precoding module, in which the coding unit delays a feedback signal of the output service data signal by one byte, then performing differential coding with the second sub-service data, and finally outputting the polarization precoded second sub-service data. The manner of polarization precoding processing prevents a noise change because of a polarization change. A polarization modulating module is configured to perform polarization modulating processing on the polarization precoded second sub-service data and the phase modulated first sub-service data optical signal, so as to obtain a phase polarization modulated signal. The polarization modulating module modulates the polarization of the optical signal, and the main implementation principle is, first dividing the optical signal into X polarization and Y polarization through a PBS, and controlling a phase change between the X polarization and the Y polarization, so as to obtain different polarization state information.

In this embodiment of the present invention, phase modulation and polarization modulation are combined at a signal transmitting end, so that each pulse, that is, each constellation point of the generated phase polarization modulated signal may carry information of three bytes or four bytes, and spectral efficiency is improved by 1.5 times to 2 times in comparison with the DQPSK signal in the prior art (each pulse thereof carries information with two bytes). Therefore, with such a transmission manner, the optical signal used in this embodiment of the present invention may carry service information at a higher rate, and requirements of the ever-increasing services on a capacity of a transmission network are met. In addition, because the phase polarization modulated signal is polarization modulated, a polarization state of the phase polarization modulated signal includes X/Y polarization only, and two orthogonal polarization states may not be interfered. In this way, the interference effect of the optical signal during transmission is reduced through polarization keying modulation. Further, because differential coding is adopted, noise floor between adjacent pulses is cancelled, thereby significantly improving transmission performance of the optical signal.

Figure 5:
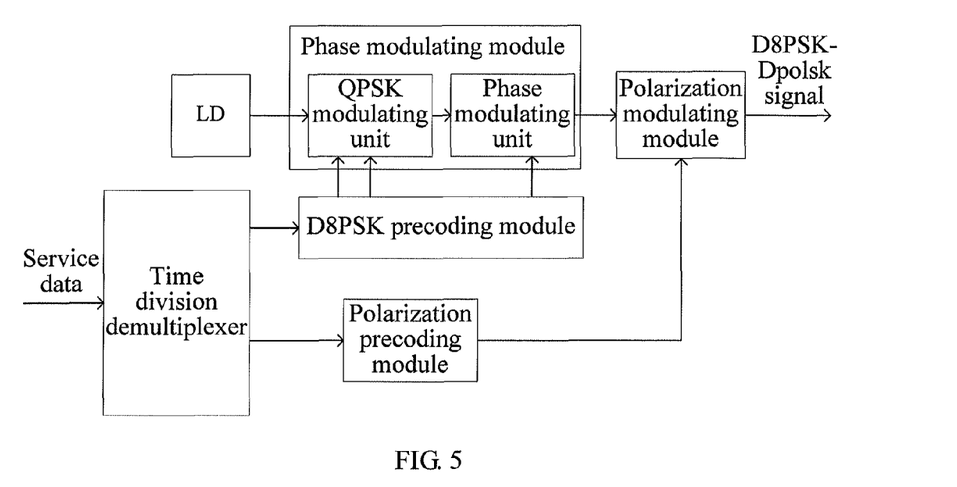
FIG. 5 is a schematic diagram of a device for generating a phase polarization modulated signal according to Embodiment 2 of the present invention.

Furthermore, FIG. 5 is a schematic diagram of a device for generating a phase polarization modulated signal according to Embodiment 2 of the present invention. Alterations are that, the phase precoding module in Embodiment 1 is specifically a Differential 8 Phase Shift Keying (D8PSK) precoding module, which is configured to perform phase precoding processing on the first sub-service data, so as to obtain phase precoded first sub-service data the phase precoded first sub-service data is divided into three paths of phase precoded service data; and the three paths of phase precoded service data are selected in an intervening selection manner. In this embodiment of the present invention, the differential coding of the precoding processing preformed for the data to be sent is implemented in an electrical domain, and both the data before and the data after coding are in a format of Non Return-to-Zero (NRZ). The principle of the coding method is that original byte information before coding is represented by a change of amplitudes of two adjacent coded bytes, that is, when the original information is '0', the amplitude of the corresponding later byte after being coded is the same as that of the corresponding former byte after being coded. For example, if the former byte is '0', the later byte is still '0'; and if the former byte is '1', the later byte is still '1'. When the original information is '1', after being coded, the amplitude of the corresponding later byte is the different from that of the former byte, that is, if the former byte is '0', the later byte is '1'; and if the former byte is '1', the later byte is '0'. The rate of coded data is maintained, and the coded data is an NRZ signal and an occupied bandwidth is not changed. The phase modulating module specifically includes a Quadrature Phase Shift Keying (QPSK) modulating unit and a phase modulating unit. The QPSK modulating unit is configured to perform orthogonal phase modulation on two of the three paths of phase precoded service data, so as to obtain a QPSK modulated optical signal; and the phase modulating unit is configured to perform binary phase modulation on one of the three paths of phase precoded service data and the QPSK modulated optical signal, so as to output a phase modulated first sub-service data optical signal.

In this embodiment of the present invention, phase modulation and polarization modulation are combined at a signal transmitting end, so that each pulse, that is, each constellation point of the generated phase polarization modulated signal may carry information of three bytes or four bytes, and spectral efficiency is improved by 1.5 times to 2 times in comparison with the DQPSK signal in the prior art (each pulse thereof carries information with two bytes). Therefore, with such a transmission manner, the optical signal used in this embodiment of the present invention may carry service information at a higher rate, and the requirements of the ever-increasing services on a capacity of a transmission network are met.

Figure 6:
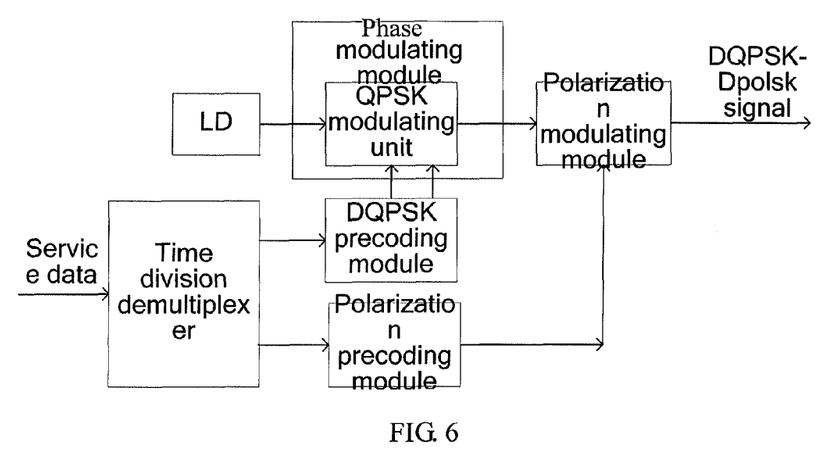
FIG. 6 is a schematic diagram of a device for generating a phase polarization modulated signal according to Embodiment 3 of the present invention.

Furthermore, FIG. 6 is a schematic diagram of a device for generating a phase polarization modulated signal according to Embodiment 3 of the present invention. The phase precoding module is specifically a DQPSK precoding module, which is configured to perform phase precoding processing on the first sub-service data, so as to obtain phase precoded first sub-service data. The phase precoded first sub-service data is divided into two paths of phase precoded service data, which are selected in an intervening selection manner.

The phase modulating module specifically includes a QPSK modulating unit, which is configured to perform orthogonal phase modulation on the two paths of phase precoded service data, so as to output a phase modulated first sub-service data optical signal.

In this embodiment of the present invention, phase modulation and polarization modulation are combined at a signal transmitting end, so that each pulse, that is, each constellation point of the generated phase polarization modulated signal may carry information of three bytes, and spectral efficiency is improved by 1.5 times in comparison with the DQPSK signal in the prior art (each pulse thereof carries information with two bytes). Therefore, with such a transmission manner, the optical signal used in this embodiment of the present invention may carry service information at a higher rate, and requirements of the ever-increasing services on a capacity of a transmission network are met.

Figure 7:
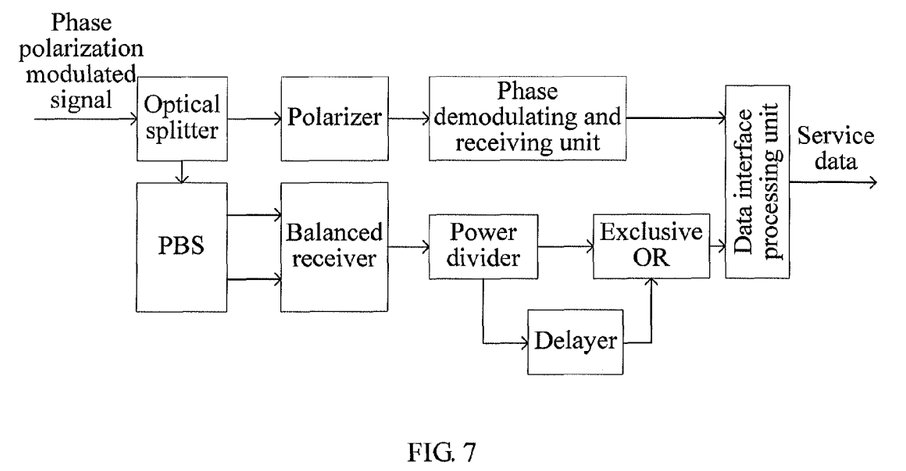
FIG. 7 is a schematic diagram of a device for receiving a phase polarization modulated signal according to Embodiment 4 of the present invention.

FIG. 7 is a schematic diagram of a device for receiving a phase polarization modulated signal according to Embodiment 4 of the present invention, and the device includes the followings. An optical splitter is configured to receive a phase polarization modulated signal and split the received phase polarization modulated signal into a first sub-phase polarization modulated signal and a second sub-phase polarization modulated signal. A polarizer is configured to perform polarizing processing on the first sub-phase polarization modulated signal, so as to obtain a first sub-phase polarization modulated signal after being polarized. By using the birefringent effect of a crystal, the polarizer selects a path of polarized signal of the first sub-phase polarization modulated signal. A phase demodulating and receiving unit is configured to demodulate and receive the first sub-phase polarization modulated signal after being polarized, so as to output a first sub-phase polarization modulated signal after being demodulated. The specific processing procedure of the phase demodulating and receiving unit is, first performing optical splitting processing on the received optical signal, and then performing delaying, interfering, and photoelectric conversion processing on the optical-split optical signal, so as to obtain the first sub-phase polarization modulated signal after being demodulated. A PBS is configured to perform polarization selection splitting processing on the second sub-phase polarization modulated signal, so as to obtain an X polarization optical signal and a Y polarization optical signal. A balanced receiver is configured to perform balanced receiving on the X polarization optical signal and the Y polarization optical signal, so as to output a balancedly received electric signal. The specific processing procedure of the balanced receiver is, performing photoelectric conversion on the received X polarization optical signal and Y polarization optical signal to obtain two paths of electric signals, and then performing subtraction between the two paths of electric signals to obtain the balancedly received electric signal. A power divider is configured to divide the balancedly received electric signal into two paths of electric signals, in which one of the two paths of electric signals passes through a delayer, and then passes through an exclusive OR with the other one of the two paths of electric signals, so as to output a second sub-phase polarization modulated signal after being demodulated. The delayer is an electrical delay component, which delays the signal by one byte by changing a length of a transmission cable. A data interface processing unit is configured to perform time division multiplexing processing on the first sub-phase polarization modulated signal after being demodulated and the second sub-phase polarization modulated signal after being demodulated, so as to obtain service data.

Furthermore, corresponding to the devices for generating a phase polarization modulated signal in Embodiment 2 and Embodiment 3 of the present invention, the phase demodulating and receiving unit is specifically a D8PSK demodulating and receiving unit or a DQPSK demodulating and receiving unit. The D8PSK demodulating and receiving unit is configured to demodulate and receive the first sub-phase polarization modulated signal after being polarized, so as to output a first sub-phase polarization modulated signal after being demodulated. The specific processing procedure of the D8PSK demodulating and receiving unit is, first performing optical splitting processing on the received optical signal, and then performing delaying, interfering, and photoelectric conversion processing on the three paths of optical-split optical signals, so as to obtain the first sub-phase polarization modulated signal after being demodulated. The DQPSK demodulating and receiving unit is configured to demodulate and receive the first sub-phase polarization modulated signal after being polarized, so as to output a first sub-phase polarization modulated signal after being demodulated. The specific processing procedure of the DQPSK demodulating and receiving unit is, first performing optical splitting processing on the received optical signal, and then performing delaying, interfering, and photoelectric conversion processing on the two paths of optical-split optical signals, so as to obtain the first sub-phase polarization modulated signal after being demodulated.

Figure 8:
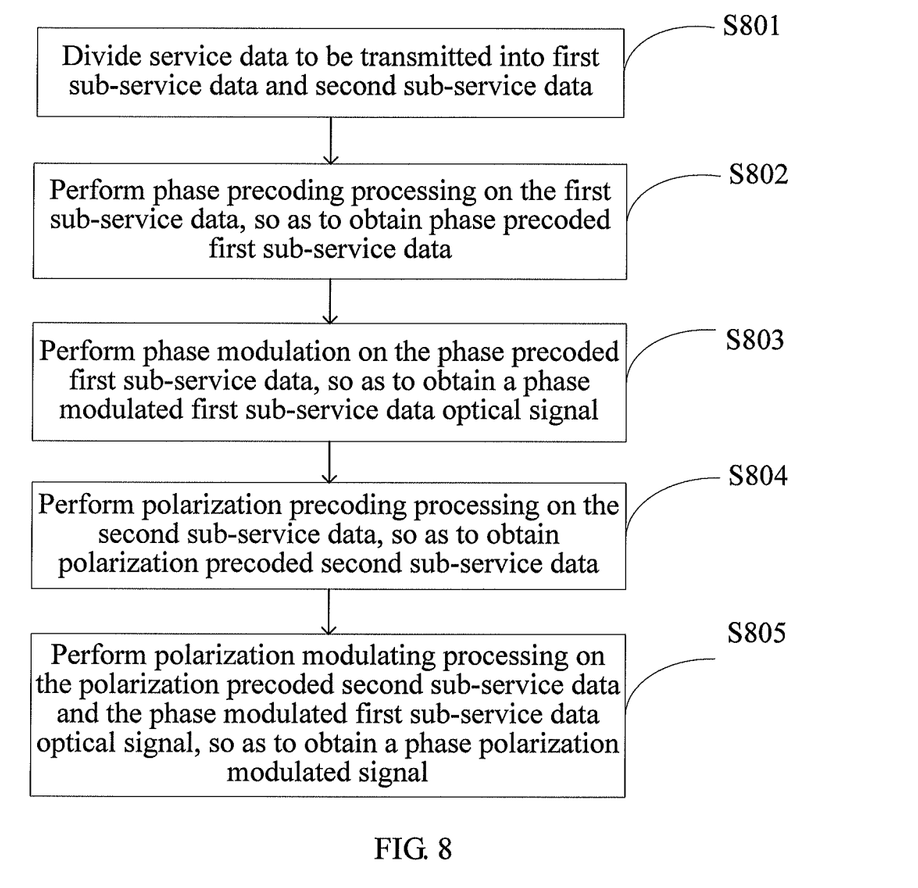
FIG. 8 is a schematic flow chart of a method for generating a phase polarization modulated signal according to Embodiment 1 of the present invention.

FIG. 8 is a schematic flow chart of a method for generating a phase polarization modulated signal according to Embodiment 1 of the present invention.

Step 801: Divide service data to be transmitted into first sub-service data and second sub-service data.

Step 802: Perform phase precoding processing on the first sub-service data, so as to obtain phase precoded first sub-service data.

Step 803: Perform phase modulation on the phase precoded first sub-service data, so as to obtain a phase modulated first sub-service data optical signal.

Step 804: Perform polarization precoding processing on the second sub-service data, so as to obtain polarization precoded second sub-service data.

Step 805: Perform polarization modulating processing on the polarization precoded second sub-service data and the phase modulated first sub-service data optical signal, so as to obtain a phase polarization modulated signal.

Furthermore, the performing the phase precoding processing on the first subservice data, so as to obtain the phase precoded first sub-service data in step 802 in this embodiment of the present invention is specifically, performing the phase precoding processing on the first sub-service data, so as to obtain three paths of phase precoded service data. The performing the phase modulation on the phase precoded first sub-service data, so as to obtain the phase modulated first sub-service data optical signal in step 803 in this embodiment of the present invention is specifically, performing orthogonal phase modulation on two of the three paths of phase precoded service data, so as to obtain a QPSK modulated optical signal; and performing binary phase modulation on the other one of the three paths of phase precoded service data and the QPSK modulated optical signal, so as to output a phase modulated first sub-service data optical signal.

In this embodiment of the present invention, phase modulation and polarization modulation are combined at a signal transmitting end, so that each pulse, that is, each constellation point of the generated phase polarization modulated signal may carry information of four bytes, and spectral efficiency is improved by 2 times in comparison with the DQPSK signal in the prior art (each pulse thereof carries information with two bytes). Therefore, with such a transmission manner, the optical signal used in this embodiment of the present invention may carry service information at a higher rate, and requirements of the ever-increasing services on a capacity of a transmission network are met.

Furthermore, the performing the phase precoding processing on the first sub-service data, so as to obtain the phase precoded first sub-service data in step 802 in this embodiment of the present invention is specifically, performing phase precoding processing on the first sub-service data, so as to obtain two paths of phase precoded service data. The performing the phase modulation on the phase precoded first sub-service data, so as to obtain the phase modulated first sub-service data optical signal in step 803 in this embodiment of the present invention is specifically, performing orthogonal phase modulation on the two paths of phase precoded service data, so as to obtain a phase modulated first sub-service data optical signal.

In this embodiment of the present invention, phase modulation and polarization modulation are combined at a signal transmitting end, so that each pulse, that is, each constellation point of the generated phase polarization modulated signal may carry information of three bytes, and spectral efficiency is improved by 1.5 times in comparison with the DQPSK signal in the prior art (each pulse thereof carries information with two bytes). Therefore, with such a transmission manner, the optical signal used in this embodiment of the present invention may carry service information at a higher rate, and requirements of the ever-increasing services on a capacity of a transmission network are met.

Because the specific contents of processes of signal processing and execution in the steps of the method are based on the same concept as that of the device embodiments of the present invention, the descriptions of the device embodiments of the present invention may be referred to for the contents, and details are not described herein again.

Figure 9:
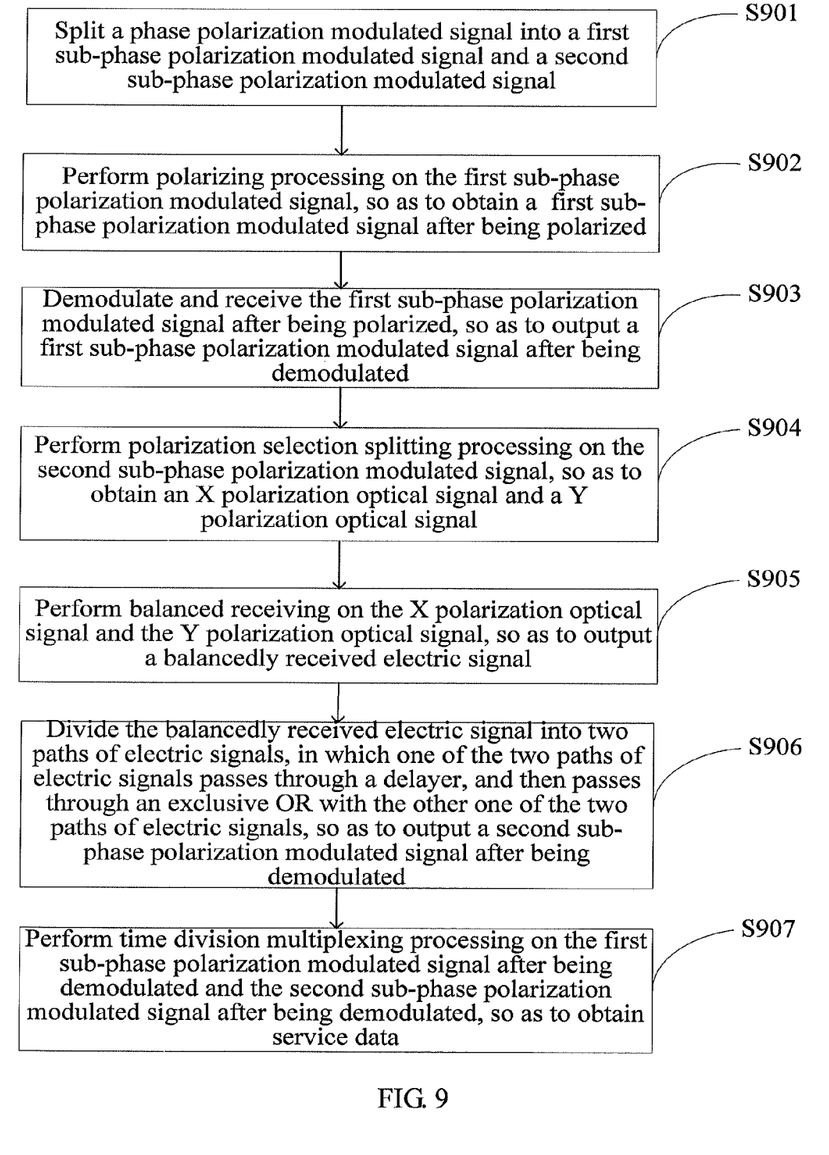
FIG. 9 is a schematic flow chart of a method for receiving a phase polarization modulated signal according to Embodiment 4 of the present invention.

FIG. 9 is a schematic flow chart of a method for receiving a phase polarization modulated signal according to Embodiment 4 of the present invention.

Step 901: Split a phase polarization modulated signal into a first sub-phase polarization modulated signal and a second sub-phase polarization modulated signal.

Step 902: Perform polarizing processing on the first sub-phase polarization modulated signal, so as to obtain a first sub-phase polarization modulated signal after being polarized.

Step 903: Demodulate and receive the first sub-phase polarization modulated signal after being polarized, so as to output a first sub-phase polarization modulated signal after being demodulated.

Step 904: Perform polarization selection splitting processing on the second sub-phase polarization modulated signal, so as to obtain an X polarization optical signal and a Y polarization optical signal.

Step 905: Perform balanced receiving on the X polarization optical signal and the Y polarization optical signal, so as to output a balancedly received electric signal.

Step 906: Divide the balancedly received electric signal into two paths of electric signals, in which one of the two paths of electric signals passes through a delayer, and then passes through an exclusive OR with the other one of the two paths of electric signals, so as to output a second sub-phase polarization modulated signal after being demodulated.

Step 907: Perform time division multiplexing processing on the first sub-phase polarization modulated signal after being demodulated and the second sub-phase polarization modulated signal after being demodulated, so as to obtain service data.

Furthermore, corresponding to the method for generating the phase polarization modulated signal in Embodiment 1 of the present invention, the demodulating and receiving in step 903 of the method for receiving the phase polarization modulated signal is specifically D8PSK demodulation receiving and DQPSK demodulation receiving. The D8PSK demodulation receiving is, first performing optical splitting processing on the received optical signal, and then performing delaying, interfering, and photoelectric conversion processing on the three paths of optical-split optical signals, so as to obtain the first sub-phase polarization modulated signal after being demodulated. The specific processing procedure of the DQPSK demodulation receiving is, first performing optical splitting processing on the received optical signal, and then performing delaying, interfering, and photoelectric conversion processing on the two paths of optical-split optical signals, so as to obtain the first sub-phase polarization modulated signal after being demodulated.

Because the specific contents of processes of signal processing and execution in the steps of the method are based on the same concept as that of the device embodiments of the present invention, the descriptions of the device embodiments of the present invention may be referred to for the contents, and details are not described herein again.

An embodiment of the present invention further provides a system for transmitting a phase polarization modulated signal, and the system includes the device for generating a phase polarization modulated signal and the device for receiving a phase polarization modulated signal, which are described above. Refer to the description of the devices for details.

In the embodiments of the present invention, phase modulation and polarization modulation are combined at a signal transmitting end, so that each pulse, that is, each constellation point of the generated phase polarization modulated signal may carry information of three bytes or four bytes, and spectral efficiency is improved by 1.5 times to 2 times in comparison with the DQPSK signal in the prior art (each pulse thereof carries information with two bytes). Therefore, with such a transmission manner, the optical signal used in this embodiment of the present invention may carry service information at a higher rate, and requirements of the ever-increasing services on a capacity of a transmission network are met. In addition, because the phase polarization modulated signal is polarization modulated, a polarization state of the phase polarization modulated signal only includes X/Y polarization, and two orthogonal polarization states may not be interfered. In this way, the interference effect of the optical signal during transmission is reduced through polarization keying modulation. Further, because differential coding is adopted, noise floor between adjacent pulses is cancelled, thereby significantly improving transmission performance of the optical signal.

Through the descriptions of the above embodiments, it is apparent to those skilled in the art that, the present invention may be accomplished by software together with a necessary hardware platform and may also be completely accomplished by hardware. In most cases, the former is an exemplary implementation manner. Based on such understanding, all or a part of the above technical solutions of the present invention that makes contributions to the prior art can be embodied in the form of a software product. The computer software product may be stored in a storage medium such as a ROM/RAM, a magnetic disk, or an optical disk, and contain several instructions to enable computer equipment (for example, a personal computer, a server, or network equipment) to perform the methods described in the embodiments of the present invention or in some parts of the embodiments of the present invention.

The above descriptions are merely exemplary embodiments of the present invention, but the present invention. Any modifications, variations or replacement that can be easily derived by those skilled in the art should fall within the protection scope of the present invention. Therefore, the protection scope of the present invention should be dependent on the protection scope of the claims.

What is claimed is:
1. A device for generating a phase polarization modulated signal, comprising:

a Laser Diode (LD), a time division demultiplexer, a phase precoding module, a phase modulating module, a polarization precoding module and a polarization modulating module, wherein the LD is configured to output an optical signal;

the time division demultiplexer is configured to divide service data to be transmitted into first sub-service data and second sub-service data;

the phase precoding module is configured to perform phase precoding processing on the first sub-service data, so as to obtain phase precoded first sub-service data;

the phase modulating module is configured to phase modulate the phase precoded first sub-service data on the optical signal, so as to obtain a phase modulated first sub-service data optical signal;

the polarization precoding module is configured to perform polarization precoding processing on the second sub-service data, so as to obtain polarization precoded second sub-service data; and the polarization modulating module is configured to perform polarization modulating processing using the polarization precoded second sub-service data on the phase modulated first sub-service data optical signal, so as to obtain a phase polarization modulated signal.

2. The device according to claim 1, wherein the phase precoding module is a Differential 8 Phase Shift Keying (D8PSK) precoding module, configured to perform phase precoding processing on the first sub-service data, so as to obtain the phase precoded first sub-service data; and the phase precoded first sub-service data is divided into three paths of phase precoded service data; and the phase modulating module comprises a Quadrature Phase Shift Keying (QPSK) modulating unit and a phase modulating unit; the QPSK modulating unit is configured to perform orthogonal phase modulation using two of the three paths of phase precoded service data, so as to obtain a QPSK modulated optical signal; and the phase modulating unit is configured to perform binary phase modulation using the other one of the three paths of phase precoded service data on the QPSK modulated optical signal, so as to output a phase modulated first sub-service data optical signal.

3. The device according to claim 1, wherein the phase precoding module is specifically a Differential Quadrature Phase Shift Keying (DQPSK) precoding module, configured to perform phase precoding processing on the first sub-service data, so as to obtain the phase precoded first sub-service data; and the phase precoded first sub-service data is divided into two paths of phase precoded service data; and the phase modulating module is a Quadrature Phase Shift Keying (QPSK) modulating unit, configured to perform orthogonal phase modulation using the two paths of phase precoded service data, so as to output a phase modulated first sub-service data optical signal.

4. A method for generating a phase polarization modulated signal, comprising:

dividing service data to be transmitted into first sub-service data and second sub-service data;

performing phase precoding processing on the first sub-service data, so as to obtain phase precoded first sub-service data;

performing phase modulation using the phase precoded first sub-service data, so as to obtain a phase modulated first sub-service data optical signal;

performing polarization precoding processing on the second sub-service data, so as to obtain polarization precoded second sub-service data; and performing polarization modulating processing using the polarization precoded second sub-service data on the phase modulated first sub-service data optical signal, so as to obtain a phase polarization modulated signal, wherein the performing the phase precoding processing on the first sub-service data, so as to obtain the phase precoded first sub-service data is, performing the phase precoding processing on the first sub-service data, so as to obtain three paths of phase precoded service data; and the performing the phase modulation using the phase precoded first sub-service data, so as to obtain the phase modulated first sub-service data optical signal is specifically, performing orthogonal phase modulation using two of the three paths of phase precoded service data, so as to obtain a Quadrature Phase Shift Keying (QPSK) modulated optical signal; and performing binary phase modulation using the other one of the three paths of phase precoded service data on the QPSK modulated optical signal, so as to output a phase modulated first sub-service data optical signal.

5. A method for generating a phase polarization modulated signal, comprising:

dividing service data to be transmitted into first sub-service data and second sub-service data;

performing phase precoding processing on the first sub-service data, so as to obtain phase precoded first sub-service data;

performing phase modulation using the phase precoded first sub-service data, so as to obtain a phase modulated first sub-service data optical signal;

performing polarization precoding processing on the second sub-service data, so as to obtain polarization precoded second sub-service data; and performing polarization modulating processing using the polarization precoded second sub-service data on the phase modulated first sub-service data optical signal, so as to obtain a phase polarization modulated signal, wherein the performing the phase precoding processing on the first sub-service data, so as to obtain the phase precoded first sub-service data is, performing the phase precoding processing on the first sub-service data, so as to obtain two paths of phase precoded service data; and the performing the phase modulation using the phase precoded first sub-service data, so as to obtain the phase modulated first sub-service data optical signal is, performing orthogonal phase modulation using the two paths of phase precoded service data, so as to obtain a phase modulated first sub-service data optical signal.

* * * * *